United States Patent [19]

Lorentz

[11] Patent Number: 4,467,826
[45] Date of Patent: Aug. 28, 1984

[54] DEVICE FOR PREVENTING THE CO-MEASURING OF GASEOUS ADMIXTURES IN THE DISPENSING OF LIQUIDS

[75] Inventor: Werner Lorentz, Hamburg, Fed. Rep. of Germany

[73] Assignee: Alfons Haar Maschinenbau GmbH, Hamburg, Fed. Rep. of Germany

[21] Appl. No.: 478,001

[22] Filed: Mar. 23, 1983

[30] Foreign Application Priority Data

Feb. 29, 1980 [DE] Fed. Rep. of Germany ....... 3007688

[51] Int. Cl.³ ............................................. F16K 11/10
[52] U.S. Cl. .................................. 137/188; 137/266; 137/263
[58] Field of Search .................. 73/200; 137/177, 183, 137/187, 188, 255, 266, 267, 263

[56] References Cited

U.S. PATENT DOCUMENTS 3,330,157 7/1967 Richards .............................. 73/200
3,654,953 4/1972 Hagdorn ......................... 137/403 X Primary Examiner—Alan Cohan
Attorney, Agent, or Firm—Beveridge, DeGrandi & Kline

[57] ABSTRACT

In a device for dispensing liquids from a first into a second container via a conveying conduit including a flow counter and shut-off means, flow measuring errors due to the presence of gas in the liquid are prevented by controlling the effective free cross-section of the shut-off means so that flow is permitted only if the pressure upstream of the flow counter is between two positive pressure values.

17 Claims, 2 Drawing Figures

DEVICE FOR PREVENTING THE CO-MEASURING OF GASEOUS ADMIXTURES IN THE DISPENSING OF LIQUIDS

FIELD OF THE INVENTION

The invention relates to a device for preventing the co-measuring of gaseous admixtures in the dispensing of liquids from a first container into a second container through a conveying conduit in which a flow measuring means and shut-off means are arranged.

The handling and transportation of liquid products particularly of petroleum oil products, for sale or distribution which involves a simultaneous flow measurement, has reached considerable importance all over the world in recent years. In the past, quantitative measurements were primarily carried out by weighing or by means of measuring containers. Recently, the use of continuously measuring volume counters has become more and more popular. However, the use of conventional flow counters or measuring means as well as other parts of the dispensing equipment lead to flow measuring errors of a considerable magnitude. Therefore, a need has arisen particularly when handling valuable products as for instance the petroleum oil products, to avoid such measuring errors as much as possible under all operating conditions.

In many cases of actual use, calibration prescriptions provide for the attaining a minimum accuracy. Since even liquid counters of high precision indicate wrong values if the measured liquid contains gaseous admixtures, the calibration prescriptions also prescribe measures by which it shall be prevented that gaseous admixtures are measured and thus impair the measuring result. For instance, this problem appears when dispensing liquids from tank cars.

The formation of gaseous admixtures, and the development of gaseous admixtures in the liquid can take place in different ways. In the residual emptying of a container, prior to the complete emptying, a vortex formation will take place depending upon the shape of the container outlet and the dispensing velocity, by which air enters the liquid to a greater or lesser extent.

Despite a so-called geodetic inflow height, i.e. a liquid column above the conveying pump or the flow counter, an underpressure can be created by flow resistances in the pipes and in the fittings. The same can happen with a gravitational dispensing by the suction towards the receiving container which is arranged at a lower position. In this way an underpressure, whether being desirable or not, can result in a sucking-in of air. Moreover, in this manner air or gas can be evolved from the liquid upstream of the counter, as a result of which the air is then co-measured.

Furthermore, in the case of a complete emptying of a chamber of, for instance a multi-chambered tank vehicle, when switching from the empty chamber to a full chamber, air may enter the conduit piping system, whereby air will pass into the measuring device.

For reasons of environmental protection, legislatures more and more often require the application of a so-called vapor recovery process in the dispensing from tank vehicles. In this process, the gas phases of containers to be emptied and to be filled are interconnected via a conduit during the dispensing. Also, the measuring accuracy can be influenced by a pressurewise influencing of the gas phase of the container to be emptied.

PRIOR ART

Various devices are known by which the co-measuring of gaseous admixtures is more or less avoided. To that end, predominantly de-gasifying devices are employed, such as gas separators or so-called gas measuring preventors, which are arranged directly upstream of the flow measuring counter and mostly are designed as quieting containers in order to separate or lead away entrained gaseous admixtures. Devices of this kind are designed from a flow engineering standpoint so as to favour the separation of gas; for instance, cyclone separators are employed in which a separation of gas is achieved by vortex formation. Floats, capacitive probes, or other sensors respond to the accumulation of gas and control the disposal of the gas fully or partly automatically. During the disposal of gas, a shut-off valve arranged downstream of the flow counter can be temporarily closed.

De-gasifying devices of the kind described above have various drawbacks. For instance, they cannot prevent the entrance of air or the separation of air or gas from the liquid and thus do not avoid a co-measuring of the same, if an underpressure and/or a leak arises between the de-gasifying device and the flow measuring counter. In many cases, particularly in the residual emptying and also upon the occurrence of underpressure in connection with leaks, the gaseous admixtures are so finely intermixed with the liquid that a complete separation in the de-gasifying device is made considerably more difficult.

Moreover, the known de-gasifying devices are relatively expensive and thus increase the expense for the overall measuring system. Moreover, the dispensing capacity is limited by the design of a de-gasifying device. With respect to the dispensing capacity, the de-gasifying device naturally forms the weakest link in the whole dispensing system.

It is furthermore known, for achieving a measured dispensing, to arrange a pump in an additional container into which the liquid flows from the container to be emptied. A float device in the additional container ensures that the pump is operational only if its suction pipe is disposed sufficiently below the liquid level. Such a device cannot be employed for gravitational dispensing.

A known system which operates with gravitational dispensing only provides a conduit which is connected downstream of the flow measuring counter or means and in turn is connected to the atmosphere. If the pressure upstream of the flow measuring counter falls below a minimum pressure, the conduit downstream of the flow measuring counter is opened, whereby the suction in the outflow conduit is broken. With a small difference in levels between the container to be emptied and the flow measuring counter, it may easily happen that with a decreasing geodetic inflow head and velocity pressure head of the liquid, these values no longer cover the pressure losses of the pipe and fitting system between the container outlet and the counter inlet, whereby an underpressure is created upstream of the flow counter. This phenomenon occurs even with a container that is still considerably filled so that the breaking of the suction takes place very early. Moreover, the breaking of the suction must be done very forcibly in order to achieve a sufficiently rapid reduction of dispensing velocity even with an unfavourably extending dispensing conduit downstream of the flow counter. Because of the reaction times which are to be taken into account, an over-controlling and in connection therewith, an undesirably strong reduction of the dispensing velocity will rapidly occur when breaking the suction. The subsequent termination of the breaking of the suction will then proceed only slowly, because of the small geodetic inflow head which is then still available. Consequently, the conveying flow increases only slowly because the air being in the outlet conduit between the counter and the receiving container is only weakly entrained, due to the small velocity of the liquid, and thus the desired suction will not develop at all or only very slowly.

THE INVENTION

It is the object of the invention to provide a device for preventing the co-measuring of gaseous admixtures in the dispensing of liquids, which device inherently has very small measuring errors and requires a minimum expense only. Moreover, the device shall be suited for use in gravitational dispensing as well as in the dispensing with a conveying pump via an empty hose, as well as selectively also via a full hose.

According to the invention, that object is attained in that a pressure measuring device measures the pressure in the conveying conduit, the shut-off means is controllable in its effective free cross-section, and a controlling device effects a variable throttling of the shut-off means so that the throttling will be initiated at a first positive pressure value, and the shut-off means will be closed at a second, lower pressure value.

In the invention, a usual de-gasifying device is eliminated, and instead, gaseous admixtures are prevented from reaching the flow measuring counter to a decisive extent. In this respect, it has been established as a starting point that the quantity of gaseous permissible will be below admissible limits as long as a sufficient positive pressure exists upstream of the flow counter. If the pressure upstream of the flow counter drops, for instance because of the decrease of the geodetic inflow head in the residual emptying of a container to be emptied, this will be an indication that the amount of gaseous admixtures will increase. If in the device according to the invention the pressure upstream of the flow counter falls below a minimum value, this will bring about a throttling of the shut-off means, with a corresponding reduction of the dispensing capacity. Thereby, the liquid will become more quiet in the container to be emptied (avoiding turbulences due to vortex formation), and the geodetic inflow head can again increase, as long as a complete emptying will not take place. An increase of the geodetic inflow head will effect a renewed pressure increase upstream of the flow counter, whereby the shut-off valve again can be opened further in order to again increase the dispensing flow temporarily. If the pressure upstream of the flow counter drops below a second, lower pressure value, the shut-off valve is completely closed. Due to a continued flow from the container to be emptied and the interposed conduit system, the lower pressure value, in the sense of a pressure increase, can again be exceeded, whereby the shut-off valve can again open with a limited effective free cross-section, to effect a slow outflow of the liquid residue until the lower positive pressure value is reached for the last time and subsequently will no longer be exceeded.

It has been found that a measuring device operating in accordance with the invention brings about by far smaller error tolerances than has been possible with hitherto conventional devices, particularly with de-gasifying devices. Despite the high measuring accuracy obtainable, the weight and the structural size of the device according to the invention are smaller than with conventional devices, whereby for instance in tank vehicles, the useful load capacity is correspondingly increased. A further advantage of the device according to the invention resides in the fact that it causes a minimum pressure loss in the conveying conduit, whereby lastly the dispensing capacity is dependent only upon the design of the conduit system and the fittings. Compared with conventional dispensing devices, an increased dispensing capacity can be achieved by the aid of the invention.

Furthermore, the device according to the invention may be advantageously employed for all possible dispensing systems, regardless whether they operate with gravity or with conveying pumps. The device according to the invention is equally applicable in systems which selectively provide a pump as well as a gravity dispensing, and this in the case of empty hose dispensing, as well as in the case of full hose dispensing. Finally, the invention also can readily take into account the above-mentioned vapor recovery process, i.e. variable pressure in the gas phase of the container to be emptied.

Subsequently, some very positive developments of the invention will be dealt with. In accordance with the invention, one of those developments resides in that throttling is effected in accordance with a progressive sequence. Consequently, the effective free cross-section of the shut-off valve is not determined proportional with the pressure change upstream of the flow counter, but, rather, in a progressive manner, i.e. with decreasing pressure, initially relatively slowly, and then continuously increasing more than proportionally.

Usually, containers to be emptied are vented, whereby it is advantageous in accordance with a further development of the invention that the second positive pressure value is above the atmospheric pressure. The measuring of atmospheric pressure in the area of the measuring device upstream of the flow counter would mean that the conduit is already empty at this point. If the shut-off valve would be shut-off completely only at this point, it would be too late to prevent the measuring of gaseous admixtures. Therefore, the pressure value at which the shut-off valve will be shut-off completely is chosen to be more or less above the atmospheric pressure.

In the vapor recovery process, however, the second positive pressure value is larger than the pressure in the gas phase of the container to be emptied in order to avoid any influence of the gas phase pressure from the view of admixing of gas into liquid.

With a pure gravitational dispensing, the measuring point for the measuring of the pressure by means of the pressure measuring device may be disposed either at the entrance to or at the outlet side of the flow measuring counter. With the optional or sole use of a conveying pump, the pressure measuring device in accordance with a further development of the invention measures the liquid pressure at the suction side of the pump.

The principle of the device according to the invention is based upon the fact that in the dispensing of liquids, the flow is decreased in accordance with the probability that gaseous admixtures will be intermixed. The pressure in the conveying conduit is employed as an indicating value for the presence of gaseous mixtures. The use of a shut-off valves for decreasing the flow is proposed because in most cases, shut-off means are in any case required by the authorities. However, it is also readily imaginable that in dispensing systems operating with conveying pumps, the conveying pump is made controllable, and the controlling device is made to control the conveying flow of the pump so that the conveying flow is decreased at the first positive pressure value, and the conveying flow becomes zero at a second, lower positive pressure value. Pumps of any kind are known in which the conveying flow can be made variable via the pump pressure, the pump rotary speed, or the cyclic conveying volume of the pump. According to a further development of the invention, the shut-off valve has a complete-open stage and a controllable small-opening stage. Two-stage shut-off valves in connection with dispensing systems are known per se. They are controlled by flow counters which are pre-settable. Upon approaching the value set, the shut-off valve is switched to the small-opening stage in order that the exactly set final point can be approached as exactly as possible. Such a shut-off valve can be advantageously employed for the invention by making controllable both stages, or only the stage having the smaller opening.

For the measuring of a pressure and the processing to form a setting order, various possibilities may be thought of. In a development of the invention, it is proposed to provide a differential pressure controller the one pressure chamber of which is subjected to a reference pressure, and the other chamber to a pressure corresponding to the pressure in the conveying conduit, and that a setting value for the shut-off valve is generated in dependence upon the position of a movable wall arranged between the chambers. As a movable wall, a diaphragm may be used, for instance. Alternatively, also a differential pressure piston can be used.

In this connection, a particularly simple solution provides that the first chamber of the differential pressure controller is connected directly, via a conduit, to the pressure in the conveying conduit. As pressure measuring device, a ram tube may be provided, the opening of which opens into the conveying conduit, particularly in the center of the conduit, in order to make possible that also the flow pressure is taken into account.

In connection with a gravitational dispensing, it is known to employ a so-called propeller pump having a low pressure head. For this connection, an embodiment of the invention provides that a propeller pump having a low pressure head is arranged in the conveying conduit upstream of the liquid counter, which pump is switched off by the control device when the throttling of the shut-off valve starts.

The propeller pump which is driven by a battery-supplied electric motor makes possible in the case of supply to gasoline service stations to increase the gravitational dispensing velocity because the pressure head generated is sufficient to compensate almost completely for the resistances of the liquid counter and the tank to be filled. In the supply to gasoline service stations, the employing of normal conveying pumps driven from the vehicle motor is not permitted.

Further advantageous developments of the invention are set forth hereinbelow.

BRIEF DESCRIPTION OF THE DRAWINGS

In the following, an embodiment of the invention will be desribed at more detail by the aid of drawings.

DETAILED DESCRIPTION OF THE DRAWINGS

Figure 1:
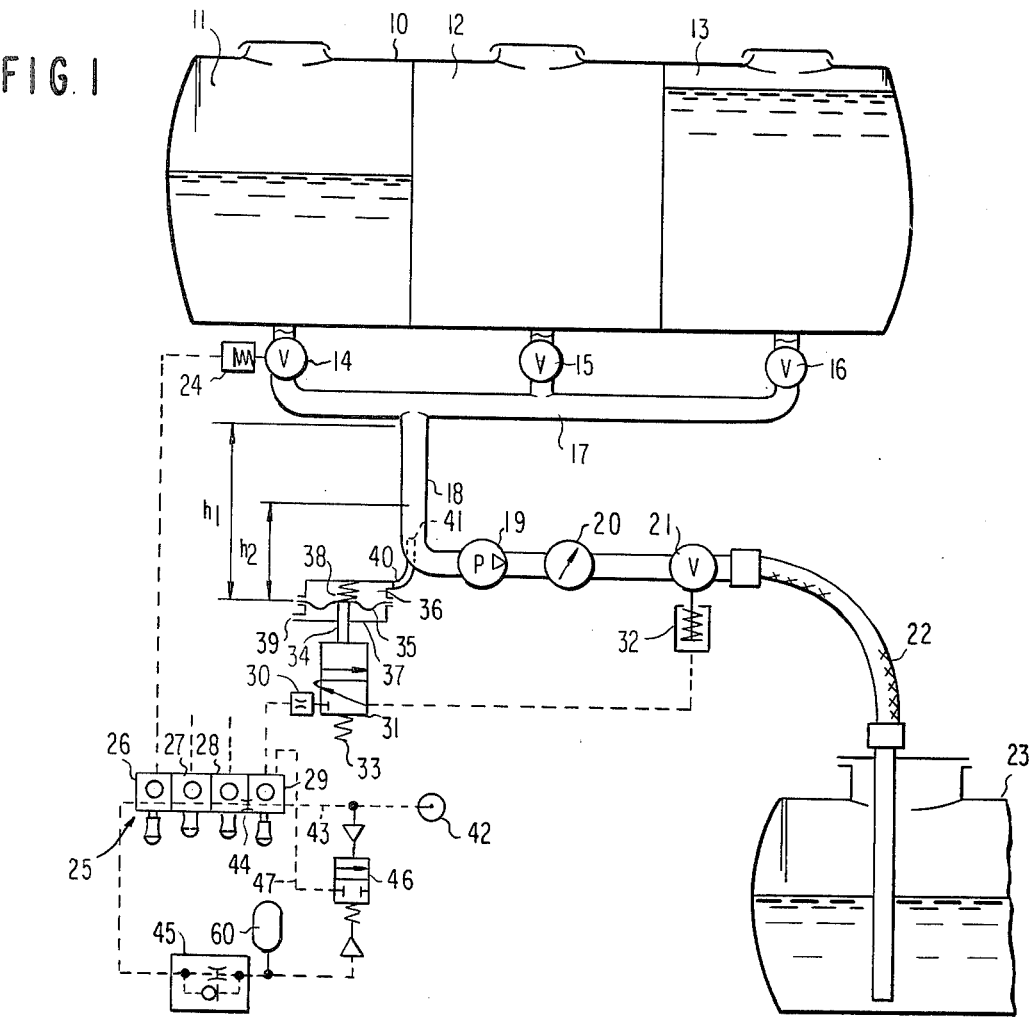
FIG. 1 illustrates diagrammatically a device according to the invention.

A tank 10, for instance of a tank vehicle, comprises three chambers or containers 11, 12, and 13. The chambers 11 to 13 each have an outflow opening at which bottom valves 14, 15, and 16, respectively, are directly arranged. The outlets of the bottom valves 14 to 16 lead to a bus conduit 17 from which a branch 18 leads via a conveying pump 19, a volume measuring counter means 20, a control valve 21, and a hose 22 to a tank 23 to be filled, for instance an underground tank.

With each bottom valve 14 to 16, a pneumatic setting cylinder is associated, of which only one is illustrated, which is designated 24 and is associated with the bottom valve 14. The actuation of the setting cylinders 24 is performed by the aid of a control block 25 which correspondingly is subdivided into three sub-units 26, 27, and 28, respectively, in correspondence with the number of bottom valves. Each sub-unit 26 to 28 is actuated by a setting button which has no reference numeral. Furthermore, a sub-unit 29 including a setting button belongs to the control block 25 and has its outlet connected via a restriction 30 to the inlet of a ⅜ way valve 31, the outlet of which leads to a pneumatic cylinder 32 for the actuation of the control valve 21. The setting piston of the valve 31 is spring-loaded by means of a spring 33. The piston rod 34 engages the lower side of a diaphragm 35 which separates two pressure chambers 36 and 37. The diaphragm 35 is biased by means of a spring 38. Whereas the chamber 37 is connected to atmosphere via a connection 39, the chamber 36 is, via a pipe 40, connected to the interior of the branch conduit 18. The opening 41 of the pipe 40 is disposed in the center and in the lower range of the vertical portion of the branch 18 and thus has the effect of a ram tube, whereby the pressure in the chamber 36 is a measure for the pressure in the range of the opening 41 in the pipe conduit branch 18. As can be readily seen, the pressure measuring point 41 thus is disposed at the suction side, or upstream side, of the conveying pump 19.

The control block 25 is supplied from the pressure medium source 42, a pressure medium conduit pipe 43 being conducted initially via the sub-unit 29 and only thereafter via a restriction valve 44 and a conduit 43 through the sub-units 28, 27, 26. The conduit 43, at the outlet of the control block 25, leads via a throttle check valve 45 to a pulse valve 46 the outlet of which is connected via a conduit 47 to a further inlet of the sub-unit 29. At the outlet of the throttle check valve 45, a reservoir volume 60 is connected to the conduit 43.

The device described operates as follows. To start operation, firstly one of the bottom valves 14 to 16 must be opened. This is initiated by actuating the associated setting button of the associated sub-unit, in the present case for instance the sub-unit 26. A pressurized source of air 42 is connected to supply line 43 which extends through the units 26 to 29. In this way, valve units 26 to 29 have their inlets connected with pressurized air. Due to the use of air which takes place in the conduit 43, a pressure drop is created in the valve 46, downstream of the restriction and via the check valve 45, and correspondingly also at the spring-loaded side of the 2/2 way pulse valve 46. Check valve 45 consists of a restriction or throttle and a check valve in parallel and prevents flow of air toward volume 60. Thereby, the second air connection is vented via the conduit 47 of the unit 29, and while an actuation of the unit 29 for the purpose of opening the shut-off valve 21 is possible, it will, however, not result in an opening of the shut-off valve 21. Only after lapse of the time predetermined by the restriction 44 and the magnitude of the volume 60 for building-up the necessary pressure at the entrance of the pulse valve 46, the control valve 21 can be opened by the aid of the pneumatic setting cylinder 32. Valve 21 is biased closed and is opened by pressure applied to 32 and is throttled when the pressure applied to 32 is reduced.

The same effect as described takes place upon the opening of another bottom valve. The shut-off valve immediately interrupts the dispensing, and operational startup again is possible only after lapse of the predetermined time. In this way, a sufficient time can be ensured for the venting of air inclusions in the conduit system below the tank 10 into the chamber with which the conduit system is connected. Necessary, however, for this mode of operation is that a sufficient venting is possible from the bus conduit 17, i.e. that from the beginning of the measuring point, a continuous increase of the conduit capacity takes place, which, however, is also provided at any time in the case of tank vehicles for reasons of outflow engineering.

Even if at the outlet of the control blocks 29, the necessary pressure has been built up which is required to set the control valve 21, the restriction 30 will bring about that the control valve 21 is opened slowly. Thereby, the dispensing flow increases slowly to the maximum. It can be readily seen that the pressure at the measuring point 41 and correspondingly in the chamber 36 is dependent upon the so-called geodetic inflow head, i.e. upon the level of the liquid, for instance in the chamber 11, but also upon the flow pressure. Pressure losses in the conduit system result in a reduction of the absolute pressure at the measuring point 41. The diaphragm 35 in combination with the spring 38, and the spring 33 acting upon the piston (not illustrated) of the valve 31 are mutually matched so that from a definite low positive pressure, as indicated by the pressure height h1, the diaphragm 35 displaces the piston of the valve 31 via the piston rod 34 so that the pressure in the pneumatic cylinder 32 is reduced and thus a throttling of the control valve 21 is brought about. This throttling becomes progressively greater, with decreasing pressure at the measuring point 41. If the pressure at the measuring point 41 reaches the pressure height h2, a rapid closing of the control valve 21 which by then is only partially open is effected. Residual amounts, particularly from the chamber walls, within a short time normally will result in a re-increase of the liquid level in the branch line 18 so that, due to the sequence described, the shut-off valve again opens slowly with a very small effective free cross-section.

Figure 2:
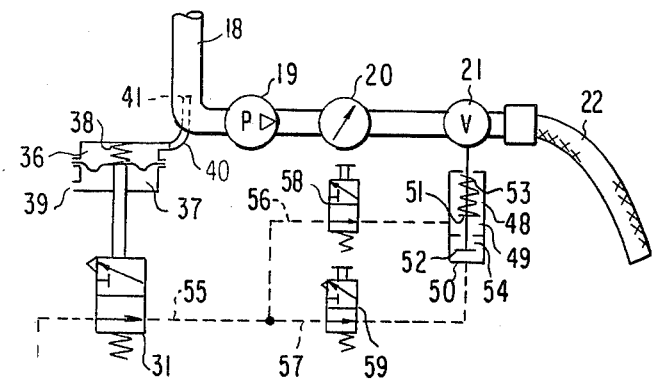
FIG. 2 illustrates a detail of the device according to FIG. 1 in a partly modified form.

In the embodiment according to FIG. 2, according to the embodiment to FIG. 1, identical parts are provided with the same reference numerals. The control valve 21 is actuated by a pneumatic setting cylinder 48 which has two series-connected cylinder chambers 49, 50, each having a piston 51 and 52, respectively. The piston 51 is biased by means of a spring downwards towards the second piston 52. The piston 52 is arranged freely movable in the cylinder 50, and its piston 54 is sealingly introduced into the upper cylinder chamber 49. The conduit 55 coming from the valve 31 is branched into conduits 56, 57, which each contain a spring-biased throttling valve 58 and 59, respectively. The outlet of the valve 59 leads to the lower cylinder chamber 50, whereas the outlet of the throttling valve 58 leads to the cylinder chamber 49. The way valves 58, 59 are designed so that with the conduit 55 being under full pressure, both cylinder chambers 49 and 50 are pressurized so that the control valve 21 is displaced into its fully opened position. If the pressure in the conduit 55 drops, also the pressure in the cylinder chamber 49 will drop, which will result in a corresponding throttling of the control valve 21. If the pressure decreases further, the piston 51 finally abuts against the piston rod 55 of the piston 52 which is in the upper position, whereby now the second opening stage of the control valve 21 is reached, and a further throttling takes place by means of the coupled movement of the pistons 51 and 52 until the final closing of the control valve 21 which is effected in that a cylinder chamber 50 is vented and the spring 53 brings about a rapid closing of the control valve 21. The pressure in the chamber 35, which in the embodiment described is assumed to be atmospheric pressure, may also be determined by the pressure in the gas phase in the chambers 11 to 13 (vapor recovery process) in order to prevent that the pressure in the gas phase in the tank 10 to be emptied influences the admixing of gas into the liquid.

It will be appreciated that the described control device may be provided in duplicate if a two-stage control valve 21 is employed which has a full-open stage and a reduced-opening stage, whereby both openings can be controlled in dependence upon the pressure measured in the branch conduit 18. If one conveying pump 19 is omitted, the measuring point 41 can be readily arranged also upstream or downstream of the volume measuring counter means 20.

What is claimed is:

1. A device for preventing the co-measuring of gaseous admixtures in the dispensing of liquids from a plurality of first containers into a second container comprising a plurality of first containers suitable for holding a liquid desired to be dispensed, each of said first containers having a separately operable bottom valve, each of said first containers being connected with a discharge conduit containing said bottom valves, a connecting conduit connecting the discharge conduits to each other, a conveying conduit connected to said connecting conduit, means for measuring flow in said conveying conduit, shut-off means arranged connected to said conveying conduit, a pressure measuring device arranged to sense changes in the pressure in the conveying conduit, the shut-off means having a controllable effective free cross-section, and control means provided to effect a variable throttling of the shut-off means depending upon said change in pressure so that throttling of said shut-off means is initiated at a first positive pressure value, and the shut-off means is closed at a lower second positive pressure value, said control means including a compulsory circuit by which the said shut-off means is automatically closed if one of said bottom valves is opened, said compulsory circuit comprising a time member which after the closing of the shut-off means opens the latter again after the lapse of a predetermined time period.

2. The device according to claim 1, wherein the throttling is effected in accordance with progressive changes in pressure as sensed by the pressure measuring device.

3. The device according to claim 1, wherein the second positive pressure value is above atmospheric pressure.

4. The device according to claim 1, wherein the second positive pressure value is larger than the pressure in the gas phase of one of said first containers to be emptied.

5. A device according to claim 1, wherein a conveying pump is provided in said conveying conduit and the pressure measuring device measures the liquid pressure at the upstream side of the pump.

6. A device according to claim 5, wherein said conveying pump is controllable, and that said control means controls the conveying flow of the pump so that the conveying flow is reduced at a first positive pressure value, and the conveying flow is zero at a lower second positive pressure value.

7. The device according to claim 1, wherein said shut-off valve operates in a two-stage sequence.

8. The device according to claim 7, wherein the shut-off valve has a full-open stage and a smaller opening stage which are controllable individually or in common.

9. The device according to claim 1, wherein a differential pressure controller is provided, having a first pressure chamber subjected to a reference pressure, and a second pressure chamber which is subjected to a pressure which corresponds to the pressure in the conveying conduit and a setting order is determined for operation of said shut-off means by the position of a movable wall in said pressure chamber arranged between the chambers thereof.

10. The device according to claim 9, wherein the movable wall is a diaphragm.

11. The device according to claim 9, wherein the first chamber of the differential pressure controller is connected via a conduit directly to a point in the conveying conduit.

12. The device according to claim 1, wherein the pressure measuring device comprises a pressure nozzle arranged in the conveying conduit.

13. The device according to claim 1, wherein a propeller pump of low pressure head is arranged in the conveying conduit upstream of the means for measuring flow in said conveying conduit and is switched off by said control means when the throttling of the shut-off means is starting.

14. The device according to claim 1, wherein said shut-off means is actuated by a pressure fluid actuated device and wherein said control means comprise a control valve which controls the supply of pressure fluid to the device via a control conduit in response to the pressure in said conveying conduit measured by said means for measuring flow.

15. The device according to claim 14, wherein a restriction is arranged in said control conduit to said device.

16. The device according to claim 1, wherein said bottom valve and said shut-off means each include actuating devices which are connected to control conduits which in turn are connected to a supply line which is connected to a pressurized fluid supply, an operating device is arranged between said supply conduit and said control conduits upstream of said actuating devices, said operating device including actuating members for each control conduit for controlling the actuation of the actuating devices, a restriction is provided in said operating device between the control conduit of the actuating device for said shut-off means and the control conduits for said actuating devices for the bottom valves, a reservoir volume and a pulse valve are connected to the supply conduit downstream of the last of said actuating devices of said bottom valves, the outlet of the pulse valve being connected to an inlet of said actuating device for said shut-off means so that latter actuating device is inactivated upon the occurrence of a pressure drop at the pulse valve.

17. The device according to claim 1, wherein the pressure measuring means is disposed in the lower range of an approximately vertical portion of the conveying conduit.

* * * * *